Oct. 24, 1933.   K. GLITSCHER   1,932,210
INDICATOR
Filed Sept. 19, 1931   3 Sheets-Sheet 3

INVENTOR
KARL GLITSCHER
BY
ATTORNEYS.

Patented Oct. 24, 1933

1,932,210

UNITED STATES PATENT OFFICE 1,932,210

INDICATOR

Karl Glitscher, Berlin-Dahlem, Germany, assignor to Gesellschaft fur Elektrische Apparate, m. b. H., Marienfelde, near Berlin, Germany, a corporation of Germany Application September 19, 1931, Serial No. 563,799, and in Germany August 12, 1930

3 Claims. (Cl. 74—78)

My invention relates to apparatus for determining the gravitational direction or horizon on vehicles or similarly moving bodies.

It is well known in the art that pendulums, gyroscopic pendulums or similar apparatus, which swing under the influence of gravity into a definite zero position, tend to leave this zero position in consequence of forces of acceleration acting upon them. In order to make the apparatus insensitive to the short period accelerations which take place due to the pitching and rolling of the vehicle, it is sufficient to give them a natural oscillation period or time of several minutes. Since the rolling and pitching periods only last at the most for twenty seconds, with such an apparatus the exciting frequency of the pitching and rolling periods is so far removed from the resonance frequency that appreciable faulty deflections do not take place.

But periods of disturbance lasting longer also take place, say, when a ship is moving in a circle, or one-sided disturbances as for example when the vehicle increases over a considerable period its rate of travel, or reduces this. Apparatus with oscillations of several minutes duration are also sensitive to such centrifugal and direct movement accelerations. It is known that the oscillation period must be increased to 84 minutes in order to exclude any disturbing influence of accelerations. With apparatus on ships, aircraft, or the like, for indicating the direction of the centre of gravity or of the horizon, it has been proved advisable to make the natural oscillation period only so great that it lies above the comparatively short oscillation period of the pitching and rolling movements of these vehicles, without being able thereby to render them insensitive to disturbances by the forces of acceleration acting mostly for a longer time which are produced by changes of speed and course of the vehicle. Apparatus with a long natural oscillation period have the disadvantage of only being ready for operation after a considerable time, and, when their position of equilibrium has been once disturbed for any reason, of often being inaccurate for hours. Furthermore, the earth's rotation has a strong influence on long oscillating gyroscopic apparatus. An apparatus with comparatively short oscillation periods has consequently considerable advantages as compared with a device having long oscillation periods when it is possible to withdraw it from the effect of the disturbing forces caused by changes of speed and direction.

According to my invention the disturbing forces caused by changes in the velocity and direction of travel of the vehicle are neutralized by providing on the pendulum, gyroscopic pendulum or the like, rotating masses which, in dependence on the velocity of the vehicle, are so adjusted or displaced in relation to the pendulum that they produce an impulse or impulse component, the vector of which is directed horizontally and perpendicularly to the direction of travel and possesses a value corresponding with the velocity of travel.

If the velocity of travel of the vehicle varies the size of the impulse vector is also changed, so that a gyroscopic action is exerted upon the pendulum by the rotating masses which action neutralizes the disturbing force caused by the change of velocity in the travel of the vehicle. If, on the other hand, the direction of travel of the vehicle varies, this vector is simultaneously turned in a corresponding manner which causes a second gyroscopic action which neutralizes the disturbing force on the pendulum caused by the centrifugal force.

For carrying out my invention a gyroscopic pendulum may be employed on which one or a plurality of auxiliary pendulums are movably arranged around axes located parallel to the direction of travel. Preferably two gyroscopes of opposite direction of rotation but of equal impulses are employed, which are automatically or by hand turned in relation to each other through an angle corresponding with the velocity of travel so that their impulse, constant in itself, receives a component located horizontally and perpendicularly to the direction of travel, which is always proportional to the velocity of travel. The adjustment of the gyroscopes may according to my invention take place by a motor directly controlled by the speed indicator or speedometer of the vehicle. If then the size of this component of the gyroscope impulse is changed by the motor, a gyrating action is set up around the Cardan axis of the gyroscopic pendulum located at right angles to the direction of travel, whereby the disturbing forces set up at the gyroscopic pendulum by changes in the velocity of travel of the vehicle are neutralized.

If, on the other hand, the direction of travel or the course of the ship changes, the vector of the impulse component mentioned is also correspondingly turned which has a gyrating action around the Cardan axis of the gyroscopic pendulum located parallel to the direction of travel and thus brings about the neutralization of the disturbing forces on the gyroscopic pendulum caused by the centrifugal force. It is of course necessary that the moments, which are produced at the gyroscopic pendulum by linear or centrifugal accelerations of equal value in the two planes located at right angles to each other, should be equal to each other. The conditions and further details of my invention are fully described with reference to two embodiments of my invention shown diagrammatically on the drawings affixed to my specification and forming part thereof. In the drawings Fig. 1 shows in perspective a gyroscopic pendulum on which, by means of a single correcting gyroscope, the forces acting in both directions, are compensated.

Figure 1:
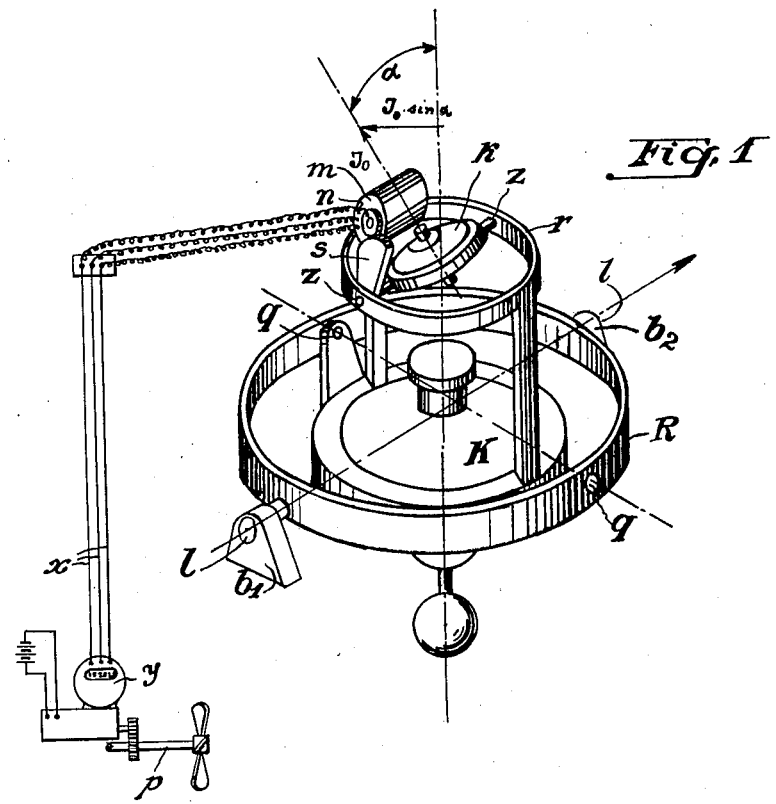

The gyroscopic pendulum shown in Fig. 1 might, for example, be used to indicate the horizon on a ship. The casing of the gyroscope K with vertical axis of rotation is carried in the usual way by means of pins $q$—$q$ in a Cardan ring R, which by means of the pins $l$—$l$ perpendicular to the pins $q$—$q$ rests in the bearing blocks $b1$ and $b2$.

The latter pins $l$—$l$ are arranged parallel to the longitudinal axis of the ship, and the ship is supposed to travel in the direction of the arrow shown. The centre of gravity of the gyroscopic pendulum is located a comparatively short distance under the Cardan axes, which means that a gyroscopic pendulum with an oscillation period of only a few minutes is produced, and that consequently it is insensible to rolling and pitching movements but not to accelerations acting for a longer time. On the casing of the gyroscope K, a ring $r$ is fixed on supports in which ring is carried a second gyroscope $k$, the casing of which is rotatable about the pins $z$—$z$ arranged parallel to the longitudinal axis of the ship, by means of a toothed quadrant $s$ firmly fixed thereto. A pinion $n$ is mounted on the shaft of a motor $m$ and engages in the toothed quadrant $s$, the motor being connected by a three phase system $x$ to a transmitter system $y$ which is driven in accordance with the speed of travel by the propeller shaft $p$. Such a controlling arrangement is well known and is merely shown diagrammatically. By means of the motor $m$, the gyroscope $k$ is rotated about the pins $z$—$z$ by an angle corresponding to the speed of travel $v$. Both gyroscopes K and $k$ may, viewed from above, rotate in counter clockwise direction. The gyroscope $k$ then produces an impulse of the value and direction of the vector $J_o$. When the speedometer indicates the speed $v$, let the axis of the impulse (that is, of the gyroscope $k$) be rotated by the angle $\alpha$ from the vertical. In the horizontal plane and perpendicular to the direction of travel, there exists then a component of the vector of the value $J_o \sin \alpha$. If now the speed of travel $v$ varies, the vector component $J_o \sin \alpha$ is also altered according to the indications of the speedometer.

A gyroscopic action is thereby created about the inner Cardan pins $q$—$q$ of the gyroscopic pendulum which are located parallel to the transverse axis of the ship. On the other hand, in consequence of the change of the speed of travel, the acceleration $$\frac{dv}{dt}$$

acts on the centre of gravity S of the gyroscopic pendulum. If $M_o$ indicates the directional moment of gravity of the gyroscopic pendulum, the disturbing moment arising from the variation of the speed of travel equals $$M_o \frac{\frac{dv}{dt}}{g},$$

where $g$ is the earth's acceleration. The equation $$\frac{d}{dt}\{J_o \sin \alpha\} = M_o \frac{\frac{dv}{dt}}{g}$$

thus gives the conditions which must be fulfilled in order in every case to neutralize or compensate the disturbing moment produced by variations of the speed of travel by the gyroscopic action. By integration is obtained the equation $$J_o \sin \alpha = M_o \cdot \frac{v}{g} + C.$$

The integration constant $C$ is preferably chosen as equal to zero. When, in addition, the conditions are so chosen that the angle $\alpha$ always remains slight, which is always possible by suitably dimensioning $M_o$ and $J_o$, there is obtained the equation $$\alpha = \frac{M_o}{J_o} \cdot \frac{v}{g}$$

When, therefore, the angle $\alpha$ with the ratio factor $$\frac{M_o}{J_o \cdot g}$$

is always proportional to the speed of travel $v$, variations in the speed of travel remain without influence on the gyroscopic pendulum. By the compulsory precession imparted to the gyroscope $k$ with variations of the speed of travel, a gyroscopic effect is always produced which neutralizes or compensates the moment of the accelerations acting on the centre of gravity of the gyroscopic pendulum in the event of variations in speed of travel.

The horizontal vector component $J_o \sin \alpha$ neutralizes, however, not only these acceleration moments, but also the moment of the centrifugal forces arising in the event of variations of the course of the ship perpendicular to the direction of travel. If, for example, the ship turns with the angular velocity $w$, then the vector component $J_o \sin \alpha$ also varies its direction with the same angular velocity. A gyroscopic action is thereby produced about the outer Cardan suspension pins $l$—$l$ with the moment $J_o \sin \alpha \cdot w$. On the other hand, the centrifugal acceleration $v \cdot w$ then acts on the centre of gravity of the gyroscopic pendulum. If $M_o$ again indicates the moment of gravity about the outer Cardan pins $l$—$l$, the disturbing moment arising from centrifugal force is equal to $$M_o \frac{v \cdot w}{g}.$$

If now conditions are so selected that $$J_o \sin \alpha \cdot w = M_o \frac{v \cdot w}{g}$$

then the effect of the centrifugal force is always completely neutralized or compensated by the gyroscopic effect. It must therefore be $$J_o \sin \alpha = M_o \cdot \frac{v}{g}$$

or also $$\alpha \sim \frac{M_o}{J_o} \cdot \frac{v}{g}$$

For the compensation of the centrifugal forces acting perpendicular to the direction of travel in the event of variations of the course, there exists the same relation as for the compensation of the forces of acceleration produced in the direction of travel in case of variations of the speed of travel. Consequently, it is thus possible with a single auxiliary gyroscope $k$ which is rotatable corresponding to the speed of travel, to neutralize the effect of the moments produced on the gyroscopic pendulum by both classes of acceleration forces. Naturally, the moment $M_o$ must then be equally large about both the Cardan axes $q—q$ and $l—l$, a relation which can always be arranged. This may be accomplished, for example, by arranging the axes $l—l$ of the outer Cardan ring R in a slightly lower plane than the axes $q—q$ of the pendulous mass, as is shown in Fig. 1. In this manner, the added mass of the Cardan ring is compensated by decreasing the distance between the axis $l—l$ and the center of gravity of the pendulous mass. This downward displacement of the axis $l—l$ is of course so chosen with respect to the weight of the Cardan ring R and the weight of the pendulous mass as to make the moments of gravity equal about both axes.

The mode of operation of the gyroscope pendulum is not influenced in any other way by the impulse vector $J_o$ of the auxiliary gyroscope $k$, because the auxiliary gyroscope cannot precess freely. The impulse of the auxiliary gyroscope $k$ is in each case simply added to the impulse of the principal gyroscope K. It is, however, clear that with high speeds of travel, in consequence of the resulting greater inclination of the vector $J_o$, the total impulse is reduced by a small amount. This also can be avoided if, instead of the single correcting gyroscope $k$, two oppositely running gyroscopes positively connected together are used.

Figure 2:
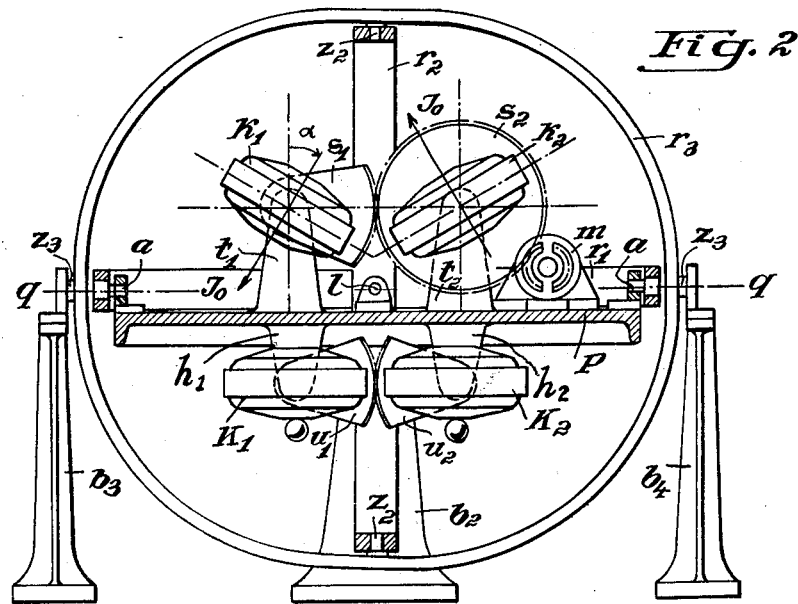
Figs. 2 and 3 show, in front and side elevation respectively, an arrangement which stabilizes around the transverse axis of the vehicle.
Figure 3:
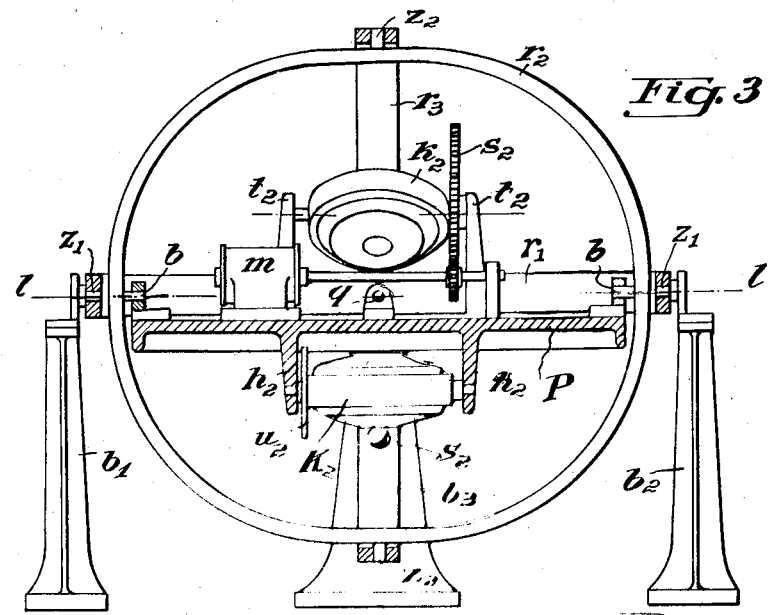

This case is represented in Figs. 2 and 3 for a gyroscope arrangement which only stabilizes about the ship's transverse axis $q—q$. The casings of two gyroscopes $K_1$ and $K_2$ rotating in opposite directions rest in the suspension lugs $h_1$ and $h_2$ of the plate P, and are coupled together by the two toothed quadrants $u_1$ and $u_2$ in the direction of the transverse axis $q—q$ of the ship, so that their axes of precession are parallel to the longitudinal axis of the ship.

They consequently stabilize the platform P against the pitching of the ship about the transverse axis $q—q$. The plate P is journalled by means of the studs $a—a$ and $b—b$ perpendicular to each other, in a horizontal ring $r_1$ and in a perpendicular ring $r_2$ respectively. The horizontal ring $r_1$ is journalled by means of the studs $z_1$ and $z_1$ which extend in the direction of the longitudinal axis $l—l$ of the ship in the lugs $b_1$ and $b_2$, while the ring $r_2$ is carried by means of the studs $z_2—z_2$ in the ring $r_3$ arranged perpendicularly and displaced by 90° from the ring $r_2$, this ring again being carried by means of studs $z_3—z_3$ which extend in the direction of the transverse axis $q—q$ of the ship in the bearing lugs $b_3$ and $b_4$. The mounting of the plate P above described forms a double Cardan journalling the purpose of which is to make it possible to measure both rolling and pitching motions of the vehicle accurately. With a single Cardan arrangement, as $a$ $r_1$ $z_1$, the turning of ring $r_1$ around its pivots $z_1$ would show the angle of roll correctly, but the turning of plate P around inner pivots $a$ would not necessarily be equal to the pitching movement since in operation the axis $a—a$ is turned out of the plane of the ship, that is, of the axes $l—l$ and $q—q$. To avoid mistakes caused by such tilting, the second Cardan journalling is provided. Since the axis $q—q$ always remains in the plane of the deck of the ship, tilting of the ring $r_3$ around this axis will give the correct angle of pitch. Furthermore, on the plate P are arranged on the supports $t_1$ and $t_2$ the casings of two oppositely rotating auxiliary gyroscopes $k_1$ and $k_2$, which are coupled together by the toothed quadrant $s_1$ and by the spur wheel $s_2$, and which can be turned by the pinion of the motor $m$ engaging the spur wheel $s_2$ by an angle corresponding to the actual speed of travel in opposite directions out of their horizontal position and parallel to the ship's longitudinal axis. As there exist here two gyroscopes $k_1$ and $k_2$, the conditions of compensation are:

$$\alpha = \frac{M_o}{2J_o} \cdot \frac{v}{g}.$$

It is obvious that when this condition is fulfilled, all the moments arising from variations of the speed of travel are compensated on the gyroscopic pendulum by the arrangement described.

Figure 4:
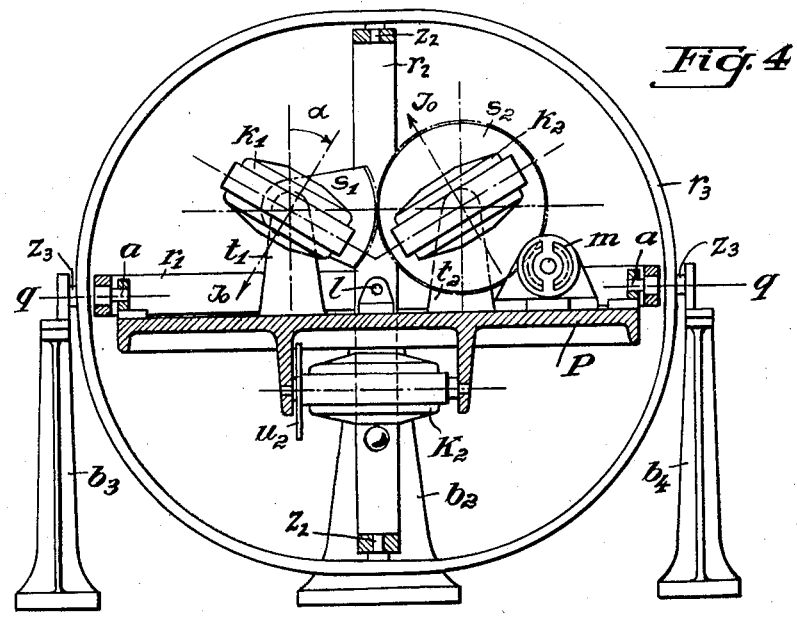
Figs. 4 and 5 show, in front and side elevation respectively, an arrangement which stabilizes around the longitudinal axis of the vehicle.
Figure 5:
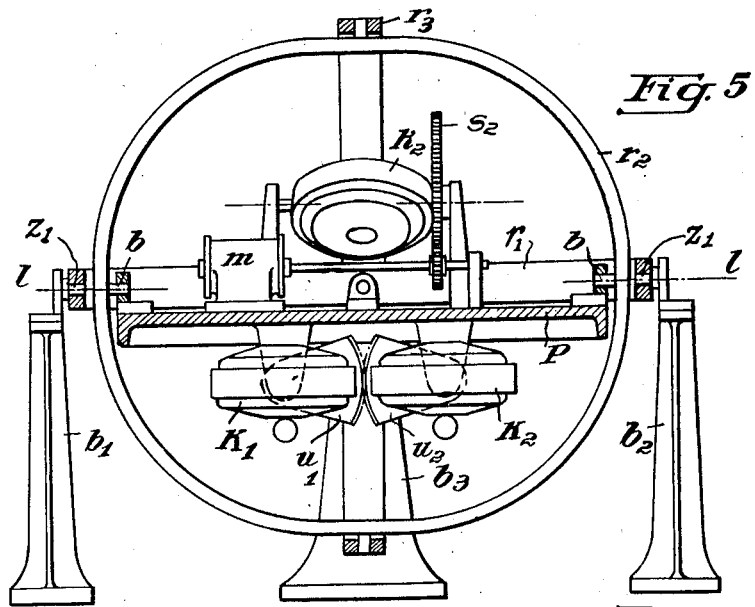

The gyroscopic pendulum shown in Figs. 4 and 5, exactly corresponds in all details to that of Figs. 3 and 4, with the single exception that this gyroscopic pendulum stabilizes the horizon about the ship's longitudinal axis $l—l$. $K_1$ and $K_2$ are again the two principal gyroscopes rotating in opposite directions, the precession axes of which for this purpose are located parallel to the ship's transverse axis $q—q$. The two oppositely rotating correcting gyroscopes $k_1$ and $k_2$ are arranged exactly in the same way as in Figs. 2 and 3. Their axes of precession are always parallel to the ship's longitudinal axis, no matter whether the principal pair of gyroscopes serves for the stabilizing about the longitudinal or the transverse axis of the ship. In the gyroscopic pendulum shown in Figs. 2 and 3, the two correcting gyroscopes $k_1$ and $k_2$ consequently serve for the compensation of the disturbing moments produced by variations of speed of travel, while these correcting gyroscopes arranged in the same way in the gyroscopic pendulum represented in Figs. 4 and 5, serve to compensate the disturbing moments acting perpendicularly to the direction of travel by the centrifugal forces released in the event of variations of the direction of travel.

The mode of operation of the arrangements described, can also be briefly explained in the following way: If the speed of the vehicle varies in amount, then the action produced thereby on the gyroscopic pendulum is neutralized in amount by a variation of the impulse of the auxiliary gyroscopes. If the speed of the vehicle varies in direction, then the moment effect thereby released on to the gyroscopic pendulum is neutralized in direction by the variation of the impulse vector.

The axes of rotation of the correcting gyroscopes which in the embodiment described stand vertically when the speed of travel is zero, can also be arranged horizontally. The pivots about which these gyroscopes are then rotated in correspondence with the speed of travel, would then be located horizontally. In this case also, a horizontal componenent, lying perpendicularly to the direction of travel, of the impulse vector of the auxiliary gyroscopes may be produced.

This impulse vector of the auxiliary gyroscopes has no influence on the gyroscopic pendulum except in the case of variations in the speed or direction of travel. Otherwise, the functions of the gyroscopic pendulum are in no way influenced or disturbed thereby.

I claim as my invention:

1. In an apparatus for determining the direction of gravity or the horizon on vehicles, a base, a pendulum, said pendulum including a gyroscopic device, means for cardanically mounting said pendulum on said base to swing about two horizontal axes substantially at right angles to each other whereby the moments of gravity of said pendulum about each of said axes are equal, a second gyroscopic device mounted on said pendulum and having freedom of movement about one axis with respect thereto, and means automatically controlled by the speed for turning said second gyroscopic device by an amount proportional to the speed of the vehicle.

2. In an apparatus for determining the direction of gravity or the horizon on vehicles, a base, a pendulum, said pendulum including a gyroscopic device, means for cardanically mounting said pendulum on said base to swing about two horizontal axes substantially at right angles to each other whereby the moments of gravity of said pendulum about each of said axes are equal, a second gyroscopic device mounted on said pendulum and having freedom of movement about one axis with respect thereto, means automatically controlled by the speed for turning said second gyroscopic device by an amount proportional to the speed of the vehicle, the axis about which said second gyroscopic device is turned being parallel to the direction of movement of the vehicle.

3. In an apparatus for determining the direction of gravity or the horizon on vehicles, a base, a horizontal Cardan ring, a pendulum, said pendulum including a gyroscopic device, means for mounting said Cardan ring on said base to turn about an axis parallel to the direction of movement of the vehicle and said pendulum on said Cardan ring to turn about an axis at right angles to the direction of movement of the vehicle whereby the moments of gravity of said pendulum about each of its axes are equal, a second gyroscopic device mounted on said pendulum and having freedom of movement with respect thereto about an axis parallel to the direction of movement of the vehicle, and means automatically controlled by the speed of the vehicle to turn said second gyroscopic device about said axis by an amount proportional to the speed.

KARL GLITSCHER.